United States Patent
Killamsetti et al.

(10) Patent No.: US 10,732,860 B2
(45) Date of Patent: Aug. 4, 2020

(54) RECORDATION OF AN INDICATOR REPRESENTING A GROUP OF ACKNOWLEDGEMENTS OF DATA WRITE REQUESTS

(71) Applicant: Hewlett Packard Enterprise Development LP, Houston, TX (US)

(72) Inventors: Praveen Killamsetti, San Jose, CA (US); Tomasz Barszczak, San Jose, CA (US); Ammar Ekbote, San Jose, CA (US); Monil Mukesh Sanghavi, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 25 days.

(21) Appl. No.: 16/040,148

(22) Filed: Jul. 19, 2018

(65) Prior Publication Data
US 2020/0026440 A1    Jan. 23, 2020

(51) Int. Cl.
*G06F 3/00* (2006.01)
*G06F 3/06* (2006.01)
*G06F 11/16* (2006.01)

(52) U.S. Cl.
CPC ............ *G06F 3/0619* (2013.01); *G06F 3/067* (2013.01); *G06F 3/0635* (2013.01); *G06F 11/1662* (2013.01)

(58) Field of Classification Search
CPC .... G06F 3/0619; G06F 11/1662; G06F 3/067; G06F 3/0635
See application file for complete search history.

(56) References Cited

U.S. PATENT DOCUMENTS

| | | | |
|---|---|---|---|
| 7,376,805 B2 | 5/2008 | Stroberger et al. | |
| 7,389,300 B1* | 6/2008 | Shah | G06F 11/1482 |
| 8,930,309 B2 | 1/2015 | Dash | |
| 2002/0028691 A1* | 3/2002 | Moulsley | H04L 1/0001 |
| | | | 455/522 |
| 2003/0170012 A1 | 9/2003 | Cochran | |
| 2009/0157766 A1* | 6/2009 | Shen | G06F 11/2097 |
| 2009/0300409 A1 | 12/2009 | Bates et al. | |

(Continued)

FOREIGN PATENT DOCUMENTS

WO    WO-2017039577 A1    3/2017

OTHER PUBLICATIONS

DellEMC, "Dell EMC SC Series Storage: Synchronous Replication and Live Volume," (White Paper), Jul. 2017, http://en.community.dell.com/techcenter/extras/m/white_papers/20439310/download, pp. 1-94.

(Continued)

*Primary Examiner* — Jing-Yih Shyu
(74) *Attorney, Agent, or Firm* — Hewlett Packard Enterprise Patent Department

(57) ABSTRACT

Examples described herein include receiving a first data write request from a host computing device, assigning a first identification to the first data write request, recording the first identification in in-flight data, transmitting the first data write request to a second storage array, receiving a first acknowledgement of the first data write request from the second storage array, and recording an indicator representing a group of acknowledgements. In some examples, the group of acknowledgements comprises the first acknowledgment.

19 Claims, 5 Drawing Sheets

(56) References Cited

U.S. PATENT DOCUMENTS

| | | |
|---|---|---|
| 2012/0102355 A1 | 4/2012 | Krishnaprasad et al. |
| 2014/0040206 A1 | 2/2014 | Ramakrishnan et al. |
| 2016/0188209 A1* | 6/2016 | Hansson ................. G06F 13/16 711/118 |
| 2018/0004617 A1 | 1/2018 | Doherty et al. |
| 2018/0004761 A1 | 1/2018 | Doherty et al. |
| 2018/0191478 A1* | 7/2018 | Uhling .................. H04L 1/1621 |

OTHER PUBLICATIONS

Wikipedia, "Sliding window protocol," Oct. 3, 2017, <https://en.wikipedia.org/w/index.php?title=Sliding_window_protocol&oldid=803572698>.

* cited by examiner

RECORDATION OF AN INDICATOR REPRESENTING A GROUP OF ACKNOWLEDGEMENTS OF DATA WRITE REQUESTS

BACKGROUND

Storage systems may comprise storage arrays in synchronous replication relationships. In such storage arrays, data may be stored on a first storage array and then mirrored to a second and/or other storage arrays. Upon unavailability of the first storage array, the data is not lost to the user, but may be accessed via the second and/or other storage array(s). Thus, these storage systems may provide users with multiple access points to data.

In some examples, one or more of the storage arrays in these storage systems may become out-of-sync (have less or more data than the other storage arrays in the system). This may occur, for example, when one storage array fails and new write requests are processed by the other remaining storage array(s). In these examples, once the previously-unavailable storage array becomes available again, the storage system may go through a resyncing process. The resyncing process may allow a storage array to once again have the same data as the storage array(s) with which it has a synchronous replication relationship.

BRIEF DESCRIPTION OF THE DRAWINGS

The following detailed description references the drawings, wherein.

DETAILED DESCRIPTION

Figure 1:
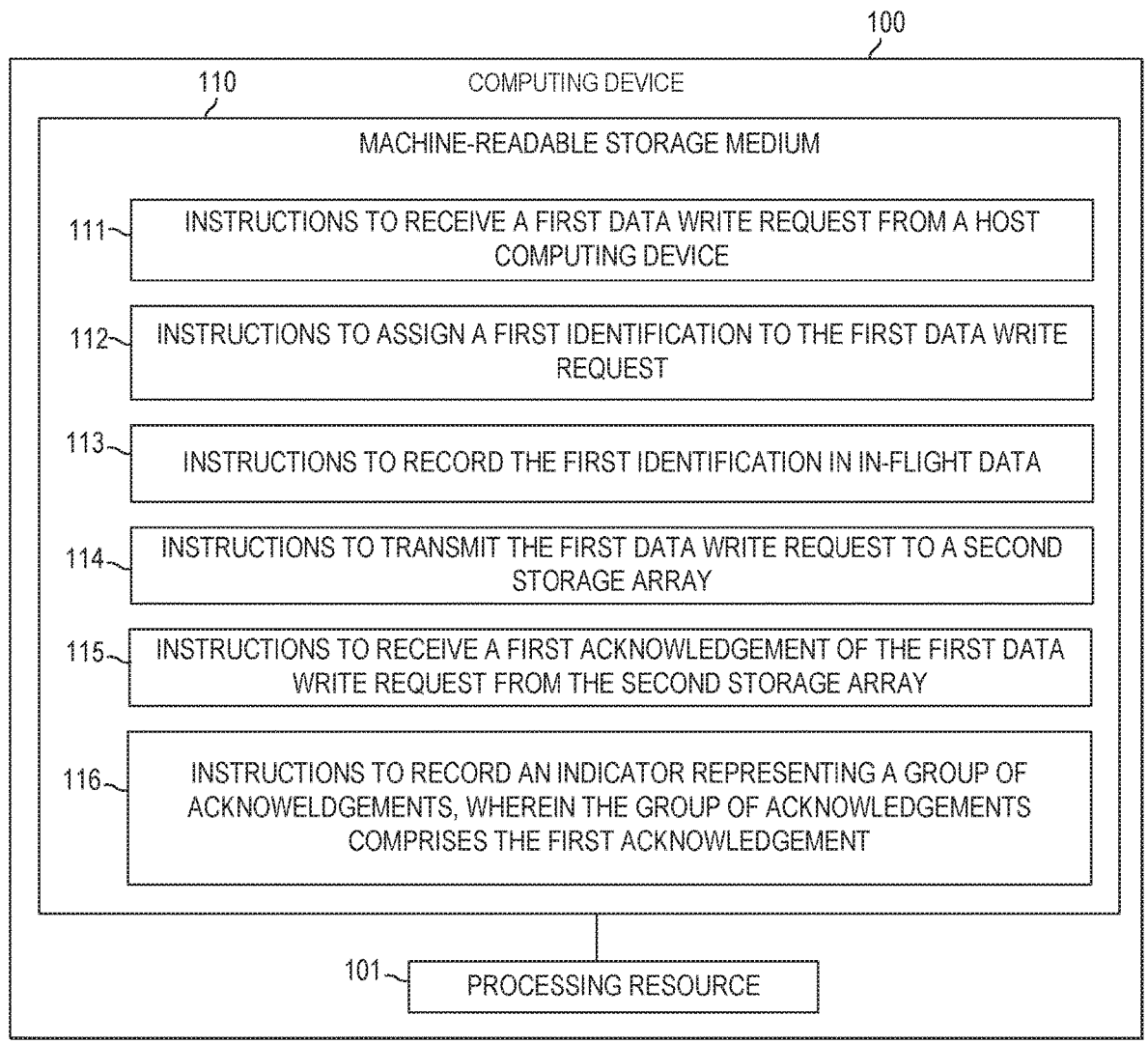
FIG. 1 is a block diagram of a computing device with instructions to record an acknowledgement indicator of a host computing device write request, according to some examples.

Storage systems may use snapshots to capture data stored on the storage arrays at a specific point in time. In some examples, the storage system may leverage a snapshot to resync the storage arrays in the system.

For example, a snapshot may be taken of the storage system (and all storage arrays in the system) at time T1. At time T1, the storage arrays in the system are in-sync with each other. At time T2 (a later point in time than time T1), one storage array becomes unavailable. After T2, other storage arrays in the system continue to process new write requests issued by connected host computing devices. The data from these requests is stored on the other storage arrays and is not stored on the failed storage array. At time T3 (a later point in time than time T2), the failed storage array is brought back online. It is now out-of-sync with the other storage arrays in the system. The storage system may then rely on the snapshot taken at T1 ("last common snapshot") to determine the data difference between T1 and T3. To resync, the out-of-sync storage array may be sent this data difference.

However, relying on the snapshot at T1 to re-sync the out-of-sync storage array may unnecessary re-send data that is already stored on the out-of-sync array. This is because the storage system processed writes between time T1 and T2 but the data from those writes are not captured by the snapshot. The re-sending of data that is already stored on the storage array results in inefficient use of storage system resources (e.g., processing capability, memory capability, etc.) and increases time needed for re-sync. These inefficiencies increase with the amount of data.

Additionally, relying on a snapshot to re-sync also does not allow the storage system the flexibility to handle situations that may arise due to the unavailability of one storage array. For example, in some examples, a storage system may be configured such that one storage array is the upstream array and a second storage array is the downstream array. Upon a failure of the upstream array, the second storage array may start to process writes and thus may be reconfigured to be the "new" upstream array. Upon a re-connection of the "old" upstream array, the "old" upstream may be reconfigured to be the "new" downstream array. In these examples, the "new" downstream array may have data that was never mirrored to the "new" upstream array before the role change occurred. To re-sync the "new" downstream, storage system may rely on the last common snapshot. Before starting the resync from the "new" downstream, the data that is present only on the "old" upstream has to be undone (as the "new" upstream does not have this data). The system may delete data from the "new" downstream that is not consistent with the last common snapshot and re-send (from the "new" upstream to the new "downstream) data that is different from the last common snapshot. This is a lengthy process that may require inefficient uses of resources and longer re-sync time.

Examples disclosed herein allow a computing system to re-sync an out-of-sync storage array without the reliance on a last common snapshot. In some examples, writes that are being mirrored (replicated) from a first storage array to a second storage array are assigned an identification and are tracked as being as "in progress" using the identification. Once the second storage array receives and/or processes the data from the mirror, the second storage array sends an acknowledgement to the first storage array. Upon receiving the acknowledgement, the first storage array may remove the write request as being "in progress". The computing system may also record an indicator to reflect acknowledgements that have been received. This allows the computing system to keep track of, 1) writes that are being replicated; and 2) writes that have been acknowledged as being replicated. As these two types are tracked "live", the computing system has a most recent count of these two types that may be relied upon in case of an out-of-sync event (e.g., storage array failure, network disconnection, etc.) Tracking these two items allows the computing system to re-sync an out-of-sync storage array upon reconnection without reliance of common last snapshot. Because these trackings allow for a more recent and more specific view of data (as it tracks more recently added data) than a common snapshot, examples disclosed herein allow for faster and more efficient re-sync processes. Examples disclosed herein also allow for more flexibility of reconfiguration of storage arrays as downstream and/or upstream.

In some examples, a computing device is provided with a non-transitory machine-readable storage medium. The non-transitory machine-readable storage medium comprises instructions, that when executed, cause a processing resource to receive a first data write request from a host computing device, assign a first identification to the first data write request, and record the first identification in in-flight data. The instructions, when executed, also cause the processing resource to transmit the first data write request to a second storage array, receive a first acknowledgement of the first data write request from the second storage array, and record an indicator representing a group of acknowledgments, wherein the group of acknowledgements comprises the first acknowledgement.

In some examples, a storage system comprises a first storage array, a second storage array, and a replication link connecting the first storage array and the second storage array. The first storage array comprises an input engine, an in-flight engine, a replication engine, an acknowledgement engine, and a resync engine. The input engine is to receive a write request. The in-flight engine is to assign a sequence identification to the write request and to record the sequence identification in an in-flight data structure. The replication engine is to transmit the write request via the replication link to the second storage array and to receive an acknowledgement for the write request via the replication link. The acknowledgement engine is to record an indicator representing a group of acknowledgements received from the second storage array. The resync engine is to sync the first storage array to the second storage array based on the in-flight data structure and the indicator.

In some examples, a method of resyncing a first storage array and a second storage array is provided. The method comprises, receiving, by the first storage array, a number of write requests from a host computing device. The method also comprises, assigning, by the first storage array, sequential identifiers to the number of write requests; storing, by the first storage array, the number of write requests by the sequential identifiers in an in-flight data structure; transmitting, by the first storage array to the second storage array, a first write request and a second write request out of the number of write requests; receiving, by the first storage array from the second storage array, a first acknowledgement for the first write request; receiving by the first storage array from the second storage array, a second acknowledgement for the second write request; and recording, by the first storage array, an indicator representing a group of acknowledgements. The group comprises the first acknowledgement and the second acknowledgement. The recording is after receiving the receiving of the second acknowledgement and the receiving of the first acknowledgement. The grouping alleviates the persistence cost of creating indicator for every acknowledgement because in some examples, recording the indicator adds extra cost to each transaction due to the persistence used.

Referring now to the figures, FIG. 1 is a block diagram of a computing device 100 with instructions thereon to record an acknowledgement indicator of a write request. As used herein, a "computing device" may be a server, computer networking device (e.g., switch), a storage device, chip set, desktop computer, workstation, personal device, etc., or any other processing device or equipment. In some examples, computing device 100 may comprise a controller of a storage array. A controller may process write requests and determine where to store the data in a storage drive of the storage array.

Computing device 100 includes a processing resource 101 and a machine-readable storage medium 110. Machine-readable storage medium 110 may be in the form of non-transitory machine-readable storage medium, such as suitable electronic, magnetic, optical, or other physical storage apparatus to contain or store information such as instructions 111, 112, 113, 114, 115, 116, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a non-volatile memory where a copy of software or other data is stored.

In the example of FIG. 1, instructions 111, 112, 113, 114, 115, and 116 are stored (e.g., encoded) on storage medium 110 and are executable by processing resource 101 to implement functionalities described herein in relation to FIG. 1. In some examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, 115, and 116 as described herein.

Instructions 111 may be executable by processing resource 101 to receive a data write request from a host computing device. The host computing device may be connected to computing device 100 via a network. The network may allow computing devices, including computing device 100 and host computing device to exchange data, commands, and information. In some examples, the network may be a wireless network, a wired network, or a combination thereof. In some examples, the network may be an individual network or a collection of many such individual networks interconnected with each other and functioning as a single large network (e.g., the Internet or an intranet). In some examples, the network may be implemented as a local area network (LAN), wide area network (WAN), etc.

The data write request received may be issued by the host computing device. For example, an application running on the host computing device may generate new data that it wants to be stored. The application may issue a data write request that is sent to computing device 100 by host computing device.

Instructions 112 may assign an identification to the data write request. The identification assigned may be unique to the write request such that the write request may be identified by computing device 100. In some examples, computing device 100 may receive multiple write requests from multiple host computing devices. The identification assigned to each write request may uniquely identify each write request received. Additionally, in some examples, the identifications assigned may be such that they indicate the order in which the write request is received by computing device 100. Thus, in some examples, the identifications may be sequential. For example, the identification assigned to a write request received first by computing device 100 may be assigned 11, the identification assigned to a write request received second by computing device 100 right after the first one may be assigned 12, etc. In some examples, write requests sent by different host computing devices may be assigned identifications that are sequential based on the order in which they are received by computing device 100, no matter which host computing device they are from.

The write request received by instructions 111 may be characterized as a "first" data write request and the identification assigned to the "first" data write request may be characterized as a "first" identification. However, "first" as used herein may or may not coincide with the order in which or the number of write requests received by computing device 100. For example, computing device 100 may receive at least one write request before the "first" write request is received.

Instructions 113 may be executable by processing resource 101 to record the first identification in in-flight data. The in-flight data may be stored in the storage medium as described above. In some examples, the in-flight data is stored in secondary memory such as non-volatile random access memory (NVRAM) such that it is persistent across power cycles and/or restarts of computing device 100. In some examples, the identification may be stored in an object. The object tracks the identification of the write, the write offset, and the length of the write. The information in the object may help to replay the data by reading it from the storage drive(s) of the storage array. In some examples, the in-flight data may organized into a structure (e.g., a tree).

In some examples, computing device 100 may comprise two controllers. This may allow a storage drive to be highly available. For example, one controller may be the primary controller that processes the write requests and one controller may be a secondary controller that may take over for the primary controller upon a failure of the primary controller. In some examples with two controllers, the in-flight data may be stored in the persistent memory of both the primary and second controllers via a two-phase commit process. Additionally, in examples where computing device 100 comprises two controllers, each controller may have its own copy of instructions 111-116, processing resource 101, machine-readable storage medium 110, etc. as described herein in relation to FIG. 1.

As described above, in some examples, computing device 100 comprises a first storage array. In these examples, computing device 100 may interact with a second storage array (not shown in FIG. 1.) The data stored on computing device 100 may be mirrored to the second storage array. Accordingly, the data associated with the write request is not lost in the event that the first storage array becomes unavailable. Upon receiving of a write request, computing device 100 may locally commit it to storage drive(s) associated with computing device 100. Computing device 100 may also transmit the write request to the second storage array for replication. Accordingly, instructions 113 may allow computing device 100 to track which writes are being sent ("in progress" or "in flight") to the second storage array. The write requests may be followed via by the identifications. For example, after locally committing the first data write request (as discussed above in relation to instructions 111), instructions 113 may allow computing device to track that the first data write request is in the process of being transmitted to the second storage array. As will be discussed below, this may allow computing device 100 to resync with second storage array after the two have been disconnected.

Instructions 114 may be executable by processing resource 101 to transmit the first data write request to the second storage array. In some examples, the transmission of the first data write request may be over the network. In some examples, the transmission may be over a designated channel between the computing device and the second storage array. In both examples, this allows a replication link between computing device 100 and the second storage array.

Instructions 115 may be executable by processing resource 101 to receive a first acknowledgement of the first data write request from the second storage array. In some examples, the acknowledgement may be sent by the second storage array upon the data in the write request being locally committed by the second storage array. In some examples, the acknowledgement may be sent by the second storage array upon the second storage array receiving the data write request.

In some examples, instructions 115 may also include instructions to remove the identification of the acknowledged write request from the in-flight data in response to receiving the acknowledgement. Thus, for example, in response to receiving a first acknowledgement for the first write request, the first identification may be removed from the in-flight data. This is done to reflect the fact that the write is no longer in progress to the second storage array.

Instructions 116 may be executable by processing resource 101 to record an indicator representing a group of acknowledgements. The group of acknowledgements comprises the first acknowledgement.

In some examples, the indicator is not recorded for each acknowledgement received but is recorded after a specific number of acknowledgements. This allows for efficiency in recordation. Because the recording of the indicator may produce latency, the recording of the indicator may be "batched". That is, the indicator may be recorded after a specific number of acknowledgements have been received. For example, the specific number may be two. After the first acknowledgement is received, an indicator is not recorded. After a second acknowledgement is received, the indicator is recorded. The indicator may reflect a group of acknowledgments that comprises the first acknowledgment and the second acknowledgment. As another example, the specific number of acknowledgements may be five. Accordingly, the indicator would be recorded (updated) after the receiving of every 5 acknowledgements. With batching of the acknowledgements, in some examples, the indicator is equal to the highest identification in every batch. For example, if a batch included acknowledgements for writes assigned the identifications 5, 8, 6, 7 in that order, the indicator would be equal to 8, which is the highest identification in that batch. The indicator would not be equal to 7 even though 7 was the fifth acknowledgement received. In some examples, the batch of acknowledgements may be characterized as a sequential group of acknowledgements. The indicator is equal to the highest sequential identification in the sequential group of acknowledgements.

The group of acknowledgements that are reflected by the indicator includes write assigned the identification that is equal to the indicator and every acknowledgements received before the indicator. For example, if the indicator was 11, the group of acknowledgements reflected by this indicator would be acknowledgements for writes assigned 1-10, if the acknowledgements for writes 1-10 were received before the acknowledgement for write 11. In other examples, the recording of the indicator is not batched and is recorded every time an acknowledgement is received. Thus, the indicator may be recorded in response to receiving each acknowledgement (for example, the "first" acknowledgement as discussed above in instructions 115). Thus, after the first acknowledgement is received, the indicator is recorded. Additionally, after a second acknowledgement is received (for a second write request), the indicator is updated. The group of acknowledgments that is reflected by the indicator thus comprises all acknowledgements received prior to the most current acknowledgement received.

In some examples, the indicator may be recorded in secondary memory such as non-volatile random access memory (NVRAM) such that it is persistent across power cycles and/or restarts of computing device 100.

Storage medium 110 of computing device 100 may also comprise instructions to re-sync itself with the second storage array in the event of a disconnection between itself and the second storage array. For example, the second storage array may encounter a failure and go offline and thus computing device 100 cannot use the second storage array to replicate data. Computing device 100 may still handle write requests while the second storage array is offline but during this time, data cannot be replicated to the second storage array. Once the second storage array comes back online, computing device 100 may have data that is not on the second storage array. Thus, the two must re-sync to ensure the difference is sent to the second storage array. In some examples, the re-syncing may be accomplished by the in-flight data and/or the indicator.

For example, computing device 100 may look at the in-flight data structure and the identifications stored in the in-flight data structure to determine which write requests were being replicated (or in-flight) to second storage array at the time of the failure of second storage array. The writes associated with these identifications were not received and/or processed by second storage array. Based on a determination that there are identifications in the in-flight data structure, computing device 100 may replay (reseed) the writes assigned these identifications to second storage array.

As another example, computing device 100 may look at the indicator to determine which write requests were already processed by second storage array. When determining which write requests need to be replayed to the second storage array, computing device 100 may ignore write requests that are assigned an identification that is lower than the indicator. In other words, computing device 100 may ignore writes associated with the group of acknowledgements reflected by the indicator. For example, if the indicator is 6 and the frequency of the recording of the indicator is 3, and there are acknowledgements showing in the computing device 100 as being received are 1, 2, and 7, computing device 100 may ignore the writes assigned 1 and 2 as they are lower than 6. Computing device 100 may replay the write request that is assigned 7, as it is higher than 6.

Accordingly, the indicator and/or the in-flight data allows computing device 100 to re-sync with second storage array in a manner that is more efficient than other methods, such as on the reliance of snapshots. This is because the frequency of snapshots may not capture recent writes. Additionally, the reliance on snapshots require the comparison of the data changes between the last snapshot and the volume, which may be time-consuming. This captures the writes that were being replicated at the time of disconnection but does not capture the data that is new. Thus, in some examples, computing device 100 may then re-sync new writes (received after the disconnection of the second storage array) to the second storage array based on a comparison between 1) a view of the storage drive of computing device 100 captured at the time of disconnection: and 2) a view of the storage drive of computing device 100 at the time of the re-connection.

Figure 2:
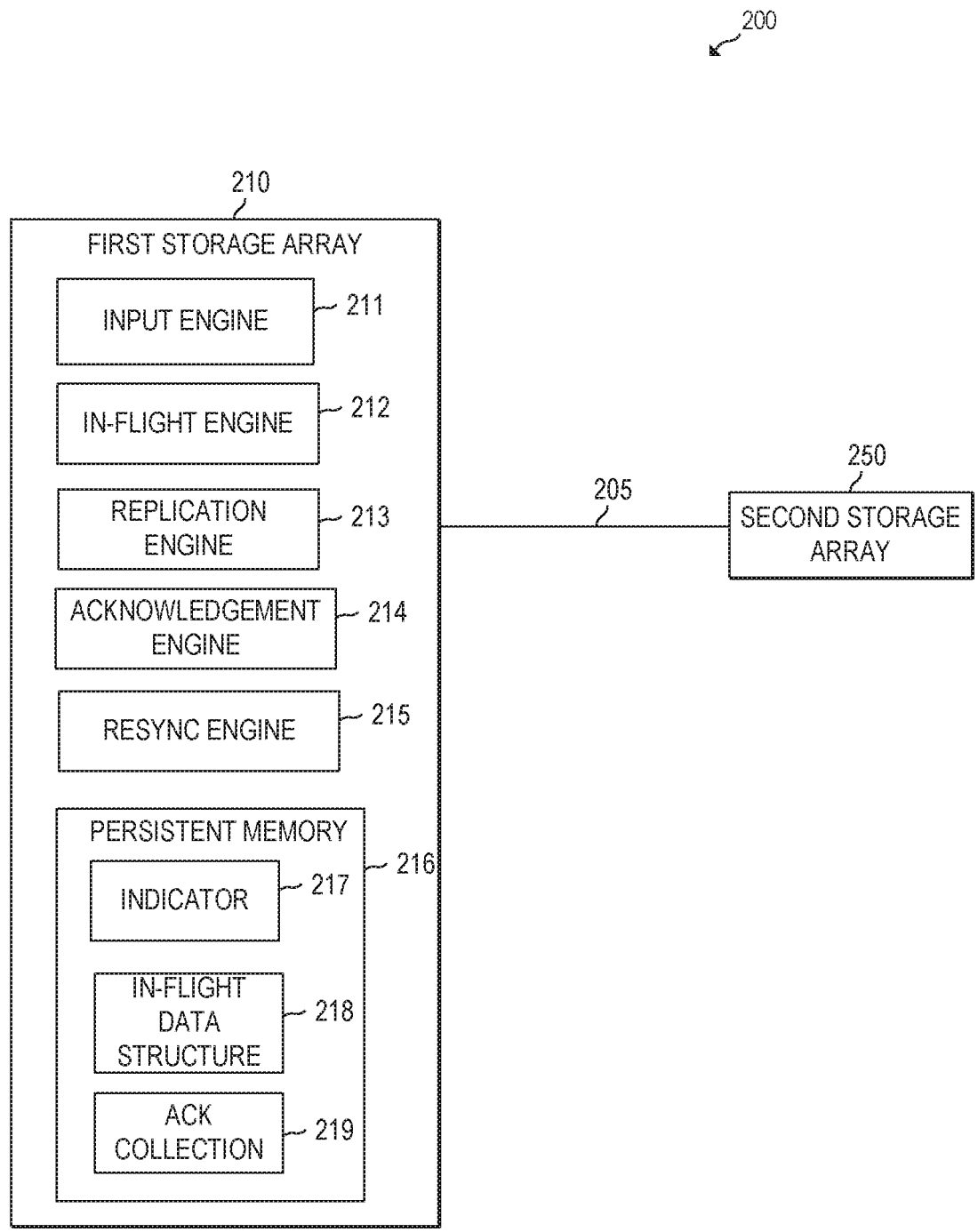
FIG. 2 is a block diagram of a first storage array connected to a second storage array, according to some examples.
Figure 3:
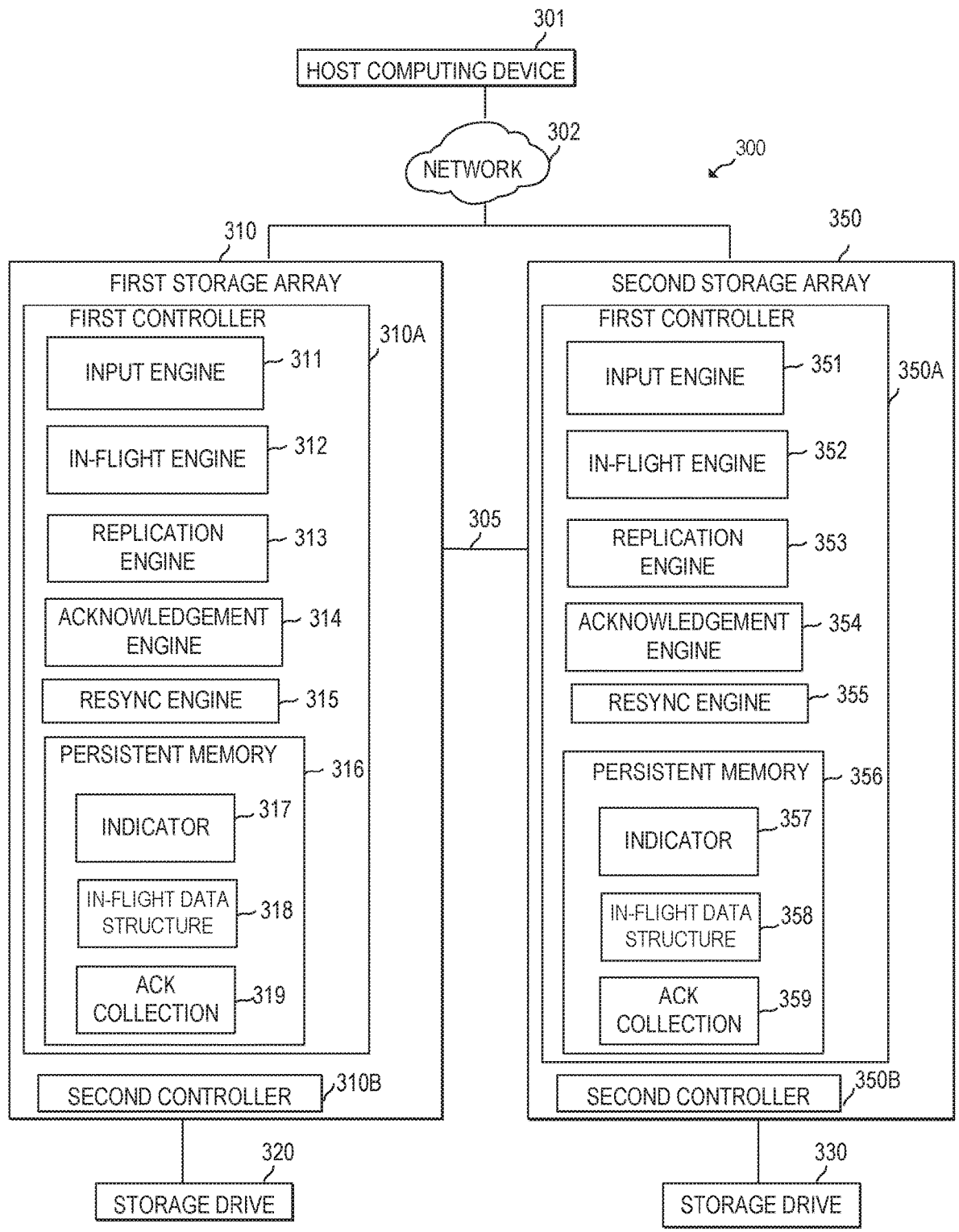
FIG. 3 is a block diagram of a first storage array connected to a second storage array, according to some examples.

Computing device 100 of FIG. 1, which is described in terms of processors and machine readable storage mediums, may include one or more aspects of storage array 200 of FIG. 2, storage system 300 of FIG. 3, which are described in terms of engines having hardware and software.

FIG. 2 is a block diagram of a storage system 200 with first storage array 210 that is connected to second storage array 250 by a network. The link between first storage array 210 and second storage array 250 may be characterized as a replication link 205. In some examples, the replication link is part of the network. In other examples, replication link 205 is a separate channel from the network.

As used herein, a replication link allows for data to be stored on one storage array and replicated on another storage array. For example, specific volume(s) on first storage array 210 may be linked to specific volume(s) on second storage array 250 such that specific volume(s) on the first storage array 210 is considered an "upstream" pool and the specific volume(s) on the second storage array 250 is considered a "downstream" pool. The upstream pool may be where a write processed is first processed and locally stored and the downstream pool is where the data that is processed by the upstream pool is replicated and locally stored. In some examples, a volume may include a data storage management object that is exposed as a small computer system interface (SCSI) logical unit number (LUN).

Accordingly, first storage array 210 and second storage array 250 may allow users of storage system 200 to have a back-up point of access to data stored in storage system 200 in the event one array is unavailable. For example, in the event first storage array 210 becomes unavailable, users may still access data via second storage array 250. In some examples, users see one volume even though there are two copies of the same volume. In other words, in some examples, the replication link between the first storage array 210 and second storage array 250 is transparent to a user.

First storage array 210 may comprise an input engine 211, an in-flight engine 212, a replication engine 213, an acknowledgement engine 214, a resync engine 215, and persistent memory 216. Persistent memory 216 may be implemented by machine-readable storage medium, specifically secondary memory as discussed above (e.g., NVRAM).

Engines 211, 212, 213, 214, 215, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted on hardware (e.g., software that is stored in a memory and executed or interpreted by a processor), or by hardware and software hosted on hardware. Additionally, as used herein, the singular forms "a," "an," and "the" include plural referents unless the context clearly dictates otherwise. Thus, for example, the term "engine" is intended to mean at least one engine or a combination of engines. In some examples, first storage array 210 may include additional engines, like some of the engines discussed in relation to storage system 300.

Engines 211, 212, 213, 214, 215 can include at least one machine-readable storage mediums (for example, more than one) and at least one processing resource (for example, more than one). For example, software that provides the functionality of engines on first storage array 210 can be stored on a memory of a computer to be executed by a processing resource of the computer. In some examples, engine of first storage array 210 may include hardware in the form of a microprocessor on a single integrated circuit, related firmware, or other software for allowing the microprocessor to operatively communicate with other hardware of first storage array 210.

Input engine 211 allows first storage array 210 to receive a write request from a host computing device that is connected to storage system 200 via a network. In some examples, the write request may be directed towards a volume on first storage array 210 that is replicated to a volume on second storage array 250. In some examples, input engine 211 may comprise a host bus adapter (HBA) that allows first storage array 210 to communicate to host computing devices.

In-flight engine 212 allows first storage array 210 to assign a sequence identification to the write request. As used herein, a sequence identification may identify the write request that is received and assign an order to the write request, in relation to other write requests received by first storage array 210. For example, a sequence identification may order a write request according to when it was received by first storage array 210. In some examples where a higher number indicates a later received time than a lower number, a first write request may be assigned a sequence identification of 5 and a second write request received directly after the first write request may be assigned a sequence identification of 6. The higher number of 6 indicates that its write is ordered after the write assigned 5. In some examples, however, a higher number may indicate an earlier received time than a lower number. Thus, in those examples, a first write request may be assigned a sequence identification of 6 and a second write request received directly after the first write request may be assigned a sequence identification of 5.

In-flight engine 212 also allows first storage array 210 to record the sequence identification in an in-flight data structure 218. In some examples, the structure may be a tree. In some examples, the in-flight data structure is an array that is sorted by the sequence identifications. In some examples, in-flight engine 212 may also include a local commit engine to process the write request on first storage array 210 and locally store the write request on storage drive(s) of first storage array 210. In some examples, the record of the sequential identification in in-flight data structure 218 may be done in response to the local storage of the write request on first storage array 210. The in-flight data structure 218 may be stored in persistent memory 216.

Replication engine 213 allows first storage array 210 to transmit the write request to second storage array 250 via replication link 205. This allows the write (that has been locally committed on first storage array 210) to be mirrored to second storage array 250. Accordingly, a user may have two accessible copies of the data in the write request but only sees one volume. The write request is transmitted to second storage array 250 with the sequence identification that is assigned to the write request by in-flight engine 212. Accordingly, second storage array 250 may use the same sequence identification to identify the write request. Upon receiving the write request, second storage array 250 may process the write request and locally commit it on second storage array 250. Second storage array 250 may send an acknowledgment to first storage array 210. In some examples, the acknowledgement may be sent upon receiving the write request replication. In other examples, the acknowledgment may be sent upon the local commitment of the data on second storage array 250. The acknowledgement comprises the sequence identification that was assigned to the write request by in-flight engine 212.

Acknowledgement engine 214 allows first storage array 210 to receive the acknowledgment. Because the received acknowledgment comprises the sequence identification, acknowledgement engine 214 may associate the received acknowledgement to a write request that is entered in the in-flight data structure 218. Thus, accordingly, in some examples, based on a receiving of an acknowledgement for a specific sequence identification, in-flight engine 212 may remove the entry for the specific sequence identification from the in-flight data structure 218. For example, based upon acknowledgement engine 214 received an acknowledgement for the write request assigned sequence identification 11, in-flight engine 212 may remove the entry in in-flight data structure 218 for sequence identification 11. Additionally, in some examples, acknowledgement engine 214 may move the entry for the received acknowledgment to acknowledgement collection data 219. In some examples, the entries are objects that are created. These objects are described above in relation to instructions 113. The objects are stored in persistent memory and may be grouped. For example, the objects are first grouped in the in-flight data structure 218. Based upon acknowledgement engine 214 receiving an acknowledgment for the write request, the object may be moved (removed) from the in-flight data structure 218 and placed in acknowledgement collection 219.

Acknowledgment engine 214 may also allow first storage array 210 to record an indicator 217 in persistent memory 216. The indicator 217 may represent a group of acknowledgements that have been received by acknowledgement engine 214. In some examples the indicator is not recorded (updated) every time an acknowledgement is received. Rather, the indicator is recorded after a specific configurable frequency of received acknowledgements is collected in acknowledgement collection 219. For example, the specific frequency may be configured for 5. After the acknowledgement collection 219 comprises 5 acknowledgements, acknowledgement engine 214 may examine the acknowledgements in acknowledgement collection 219. It will record an indicator that based on a determination that there are acknowledgements in the collection with sequence identifications that are sequential. The indicator itself will be equal to the highest sequence identification. For example, the acknowledgement collection 219 may comprise 5 acknowledgements for writes assigned the sequence identifications 1, 6, 2, 3, 7, and 4. The indicator that is recorded reflects a group of acknowledgements that comprises 1, 2, 3, and 4 because that is the sequential group. The indicator that is recorded is equal to 4 because that is the highest sequence identification in the sequential group. Acknowledgement engine 214 may also free the group of acknowledgements from acknowledgement collection 219. Thus, acknowledgements for writes assigned 1, 2, 3, and 4 are freed from acknowledgement collection 219. Acknowledgement for writes assigned sequence identifications 6 and 7 are left in acknowledgement collection 219. Because recording an indicator may take up resources that may cause latency, batching the acknowledgements may offset the latency.

In some examples, the specific frequency is based on the number of acknowledgements received and not the number of acknowledgements in acknowledgement collection 219. Thus, the acknowledgement engine 214 may examine the acknowledgement collection 219 after it receives a specific number of acknowledgements not depending on how many acknowledgements are stored in acknowledgement collection 219.

Resync engine 215 allows first storage array 210 to sync the first storage array 210 to second storage array 250. Syncing may be required when the two arrays are disconnected. This may be due to network outage, link corruption, or failure of first storage array 210 or second storage array 250. Thus, resync engine 215 may allow first storage array 210 to receive an indication that there is a disconnection between first storage array 210 and second storage array 250. During the time that first storage array 210 is not connected to second storage array 250, first storage array 210 may continue to process write requests received by host computing devices. After a period of time, resync engine 215 may receive an indication that first storage array 210 is now connected to second storage array 250. Based on this indication, resync engine 215 may start the process of re-syncing first storage array and second storage array. As used herein, syncing is the process of ensuring that the data stored in first storage array 210 and the data stored in second storage array 250 are similar such that a user utilizing storage array 200 may access the data from either arrays.

In some examples, resync engine 215 may sync based on the in-flight data structure 218. This is because the in-flight data structure 218 comprises writes that were transmitted to second storage array 250 by replication engine 213 but for which an acknowledgement was not received. These writes were interrupted in the middle of being replicated. Accordingly, resync engine 215 may replay these writes to second storage array 250. The writes may be transmitted with the original sequence identification that was assigned by in-flight engine 212. Upon receiving an acknowledgement for these writes, acknowledgement engine 214 may remove the entry for the assigned sequence identifications from in-flight data structure 218. Additionally, acknowledgement engine 214 may place an entry for the assigned sequence identifications in acknowledgement collection 219.

In some examples, resync engine 215 may sync the two storage arrays based on the indicator 217 and/or acknowledgement collection 219. This is because indicator 217 reflects a group of acknowledgements that have already been processed by second storage array 250. Thus, a sequence identification in the acknowledgement collection 219 that represents a "later" (e.g., higher number) than the indicator may also be replayed.

Additionally, indicator 217 may allow resync engine 215 to ignore any writes that are assigned a sequence identification that represents an "earlier" write request (e.g., a lower number). For example, some acknowledgements may remain that have already been processed by second storage array 250. The indicator may help first storage array 210 identify which acknowledgements may be ignored. Resync engine 215 may also replicate the writes that are received after the disconnection of the first storage array 210 and second storage array 250 (as described above in relation to computing device 100).

In some examples, the cause of disconnection between first storage array 210 and second storage array 250 may be a failure of first storage array 210. Upon process restart of first storage array 210, resync engine 215 may allow the continuance of normal operations for first storage array 210 without the need of a reference to a last common snapshot. For example, because the in-flight data structure 218 records writes that should be replayed, first storage array 210 may know that the extra data that it may have committed is captured and will be replicated to second storage array 250. Without the in-flight data structure 218, first storage array 210 may have extra data that was locally committed on itself but never replicated to second storage array 250. Accordingly, without in-flight data structure 218, first storage array 210 may need to fail back to the last common snapshot.

In some examples where the disconnection between the two storage array is the failure of first storage array 210, second storage array 250 may process new write requests from host computing devices while first storage array 210 is unavailable. Accordingly, the roles of the two storage arrays may be reversed such that second storage array 250 becomes the "upstream" pool. Upon restart of first storage array 210, it then becomes the new "downstream" pool and must replicate the writes that were received by second storage array 250 after first storage array 210 became unavailable. However, at the time that first storage array 210 became unavailable, writes may have been in progress to second storage array 250 but was never received and/or acknowledged by second storage array 250. Because these writes were never received and/or acknowledged by second storage array 250, these writes may have not been acknowledged to the host computing device that issued the write request. Thus, assuming that the host computing device does not repeat the write request, first storage array 210 has data locally committed that is not on second storage array 250. Accordingly, in some examples, resync engine 215, based on the in-flight data structure 218, may identify regions on first storage array 210 (e.g. storage drive) with the data from these writes. These regions on first storage array 210 may then be matched by determining what data resides on these regions on second storage array 250. The data residing on these same regions on second storage array 250 may be sent from second storage array 250 to first storage array 210. This allows the data that is locally committed on first storage array 210 but not on second storage array 250 to be deleted and overwritten. This also allows second storage array 250 to be synced with first storage array 210 without reliance on a common snapshot.

In some examples, first storage array 210 may comprise two controllers. Each controller may include its own copy of engines 211-215 and persistent memory 216. In these examples, the in-flight data 218, indicator 217, acknowledgement collection 219 may be stored on persistent memory of both controllers via a two-phase commit between the two controllers. This is described in more detail in relation to FIG. 3.

Storage system 200, which is described in terms of engines having hardware and software, may include one or more aspects of storage system 300 of FIG. 3 or computing device 100 of FIG. 1.

FIG. 3 is a block diagram of a storage system 300 with a first storage array 310 and a second storage array 350. First storage array 310 interacts with storage drive 320 and second storage array 350 interacts with storage drive 330. A storage drive, as used herein, may store data generated by users of storage system 300. The storage drive may comprise secondary memory, as described herein, including but not limited to storage medium such as flash, etc. Storage system 300 interfaces with host computing device 301 via network 302. As shown in FIG. 3, first storage array 310 is connected to second storage array 350 via a separate replication link 305 that is a dedicated channel, as opposed to network 302. However, in other examples, replication link 305 may be part of network 302.

In storage system 300, both first storage array 310 and second storage array 350 may process write requests from host computing device 301. For example, with regard to a specific write request, first storage array 310 may be the storage array to first locally commit the data and then replicate the specific write request to second storage array 350. However, with regard to another specific write request, second storage array 350 may be the storage array to first locally commit the data and then replicate the specific write request to first storage array 310. Thus, first storage array 310 may be considered "upstream" with regard to some write requests while second storage array 350 may be considered "upstream" with regard to other write request. In some examples, storage system 300 may be configured such that each storage array may be "upstream" for a specific sequential number of write requests. Once the specific sequential number is met, the other storage array may be "upstream" for a specific number of write requests.

In the example of FIG. 3, each storage array may comprise two controllers. First storage array 310 may comprise first controller 310A and second controller 310B. Second storage array 350 may comprise first controller 350A and second controller 350B. Each pair of controllers (310A and 310B, 350A and 350B) may be in an active/passive configuration. In an active/passive configuration, one controller is the principle processor of the write request received by the storage array. The other controller may take over if and when the first controller becomes unavailable. However, in other examples, each pair of controllers is an active/passive configuration. In an active/active configuration, either controller may process the write request received by the storage array.

First controller 310A of first storage array 310 comprises an input engine 311, an in-flight engine 312, a replication engine 313, an acknowledgement engine 314, a resync engine 315, and a persistent memory 316. Second controller 310B also comprises an input engine, an in-flight engine, a replication engine, an acknowledgement engine, a resync engine, and a persistent memory. These are not shown in FIG. 3 for clarity.

Input engine 311 is similar to input engine 211 as described in relation to FIG. 2.

In-flight engine 312 is similar to in-flight engine 212 as described in relation to FIG. 2 except that in-flight engine 312 may also allow first storage array 310 to communicate to second storage array 350 to determine sequence identifications to assign to write requests such that a sequence identification assigned represents the desired order whether it is assigned by in-flight engine 312 (on a write request received by input engine 311) or assigned by in-flight engine 352 (on a write request received by input engine 351). For example, in-flight engine 312 may communicate to in-flight engine 352 and vice versa which sequence identifications are assigned, such that each in-flight engine knows what the next received write should be assigned. That way, writes received are ordered across first storage array 310 and second storage array 350 no matter which storage array receives the write request.

Additionally, in-flight engine 312 in first controller 310A may communicate to in-flight engine in second controller 310B (not pictured in FIG. 3.) Accordingly, both controllers 310A and 310B have the in-flight data 318 recorded in their individual persistent memory.

Replication engine 313 is similar to replication engine 213 as described in relation to FIG. 2.

Acknowledgement engine 314 is similar to acknowledgement engine 214 as described in relation to FIG. 2 except that acknowledgement engine 314 may communicate to the acknowledgement engine in second controller 310B such that both controllers 310A and 310B have the indicator 317 and acknowledgement collection 319 recorded in their individual persistent memory.

Resync engine 315 is similar to resync engine 215 as described in relation to FIG. 2 except that resync engine 315 may decide upon which action to take based on the "role" that it played in a specific volume, as is described below.

Persistent memory 316 is similar to persistent memory 216 as described in relation to FIG. 2. Similarly, indicator 317, in-flight data 318, and acknowledgement collection 319 are similar to indicator 217, in flight data 218, and acknowledgement collection 219 as described above in relation to FIG. 2.

Second storage array 350 comprises a first controller 350A and a second controller 350B. First controller 350A comprises an input engine 351, an in-flight engine 352, a replication engine 353, an acknowledgement engine 354, a resync engine 355, and persistent memory 356. The engines comprised in first controller 350A are similar to the engines comprised in first controller 301A, except that the functionalities are in relation to second storage array 350. For example, acknowledgment engine 314 receives acknowledgements from second storage array 350 and records the received acknowledgements in acknowledgement collection 319 while acknowledgement engine 354 receives acknowledgements from first storage array 310 and records the received acknowledgements in acknowledgement collection 359. Similarly, in-flight engine 312 records the writes that are in-flight to second storage array 350 in in-flight data 318 while in-flight engine 352 records the writes that are in-flight to first storage array 310 in in-flight data 358. Second controller 350B comprises an input engine, an in-flight engine, a replication engine, an acknowledgement engine, and a resync engine. These are not shown in FIG. 3.

Persistent memory 356 is similar to persistent memory 316. Indicator 357 that is recorded in persistent memory 356 reflects a group of acknowledgements that have been received by second storage array 350. Thus, indicator 317 and indicator 357 may be different from each other.

Upon reconnection after a disconnection from each other, each storage array may resync. Thus, resync engine 315 may determine which writes to replay based on indicator 317, in-flight data 318, and/or acknowledgement collection 319, and resync engine 355 may determine which writes to replay based on indicator 357, in-flight data 358, and/or acknowledgement collection 359. For example, in volumes in which first storage array 310 played an upstream "role" (i.e. first storage array 310 received the write request from the host computing device and replicated the data to second storage array 350), first storage array 310 replays (resends to second storage array 350) the writes assigned the sequential identifications that are recorded in in-flight data 318. In volumes which first storage array 310 played a downstream "role" (i.e. second storage array 350 received the write request from the host computing device and replicated the data to first storage array 310), resync engine 315 may delete data stored in those locations on first storage array 310 (as indicated by the in-flight data structure 358 and/or indicator 357) and retrieve the data from second storage array 350 to commit that data locally to first storage array 310. This may be characterized as a roll-back.

Storage system 300, which is described in terms of engines having hardware and software, may include one or more aspects of storage system 200 of FIG. 2 or computing device 100 of FIG. 1.

Figure 4:
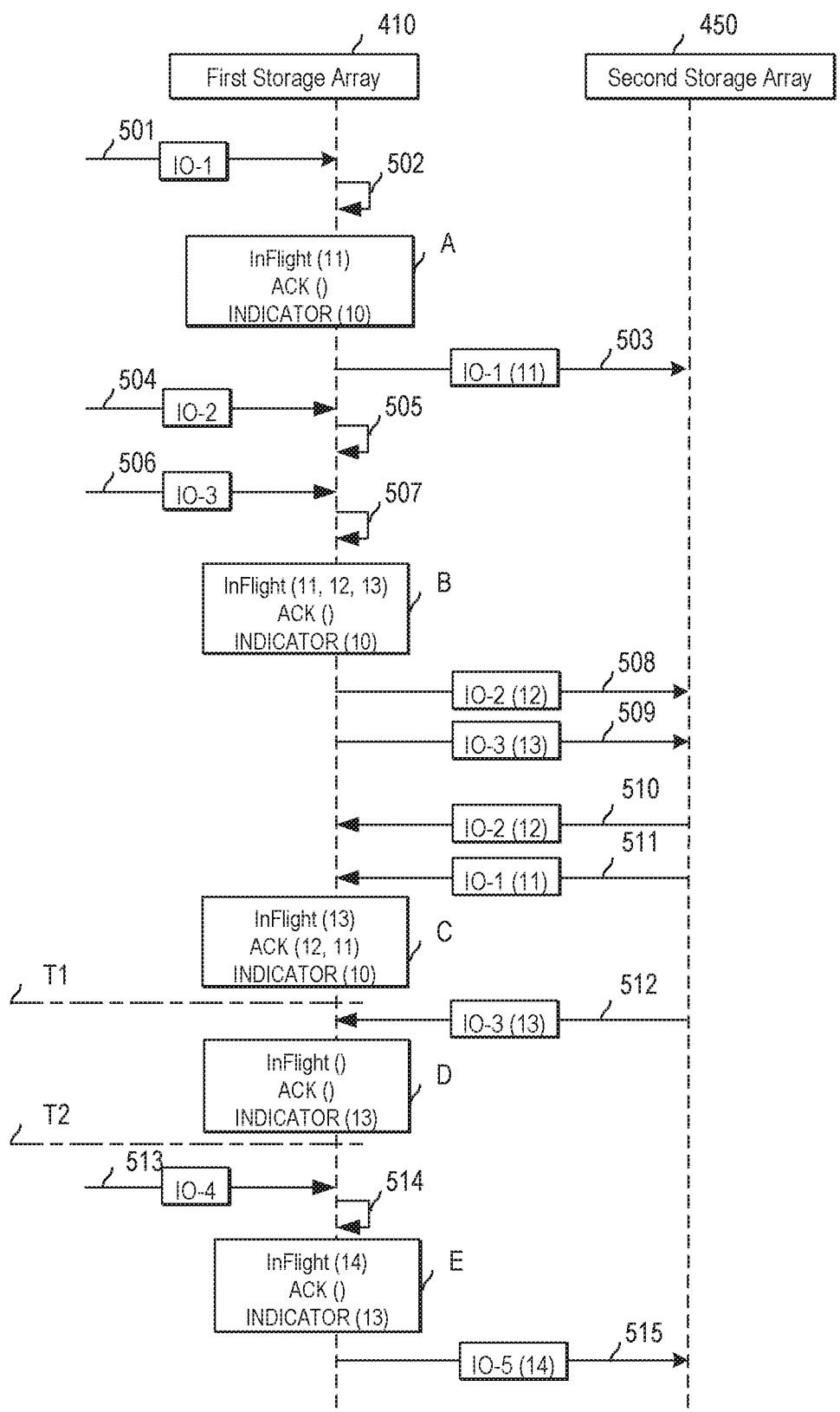
FIG. 4 is a diagram of tracking of data write requests, according to some examples.

FIG. 4 illustrates a diagram of tracking of data write requests between first storage array 410 and second storage array 450. In the example of FIG. 4, first storage array 410 is the "upstream" array and second storage array is the "downstream" array.

First storage array 410 receives a write request IO-1 at 501. First storage array 410 processes write request IO-1 and locally commits it at 502 to its storage drive(s). As shown at A in FIG. 4, first storage array may assign IO-1 a sequential identification of 11 and place an entry for 11 in its in-flight data structure (labeled "InFlight" in FIG. 4). Additionally, as shown in A, the acknowledgment collection (labeled "ACK" in FIG. 4) for first storage array is empty and the indicator (labeled "INDICATOR") in FIG. 4) is equal to 10. In the example of FIG. 4, an indicator of 10 may represent acknowledgements for writes that have been assigned a sequential indicator of 10 and below. This indicator represents prior received acknowledgements before IO-1 was received.

First storage array 410 may transmit the write request IO-along with the sequential identification assigned to IO-1 to second storage array 450 at 503. At 504, first storage array 410 receives write request IO-2. First storage array 410 processes write request IO-2 and locally commits it at 505 to its storage drive(s). At 506, first storage array 410 receives write request IO-3. First storage array 410 locally commits the data associated with write request IO-3 at 507. As shown at B in FIG. 4, first storage array 410 may assign IO-2 a sequential identification of 12 and IO-3 a sequential identification of 13. Thus, the identifications assigned to IO-1, IO-2, and IO-3 represent the order in which they were received by first storage array 410. Also as shown at B in FIG. 4, first storage array 410 may place entries for sequential IDs 12 and 13 in its in-flight data structure. At B, first storage array 410's acknowledgement collection remains empty and indicator is still equal to 10.

At 508, first storage array 410 mirrors write request IO-2 and its sequential identifier to second storage array 450. At 509, first storage array 410 mirrors write request IO-3 and its sequential identifier to second storage array 450. At 510, first storage array 410 receives an acknowledgement for IO-2 from second storage array 450. At 511, first storage array 410 receives an acknowledgement for IO-1 from second storage array 450.

As shown in C, the entries for sequential identifications 11 and 12 are removed from the in-flight data structure because first storage array 410 has received acknowledgements for writes assigned those sequential identifications. Entries for 11 and 12 are entered into the acknowledgement collection. The indicator is still at 10. Accordingly, the indicator is not recorded (updated) even though first storage array 410 has received acknowledgements for 11 and 12.

At 512, first storage array 410 receives an acknowledgement for IO-3. As shown in D, the entry for sequential identification 13 is removed from the in-flight data structure because first storage array 410 has received an acknowledgement for the write assigned the sequential identification of 13. The indicator is recorded (updated) to 13 and the acknowledgement collection is emptied. This is because with the receiving of an acknowledgement for IO-3, first storage array 410 has 3 acknowledgements in its acknowledgement collection: 11, 12, and 13. 13 is the highest sequential identification in this sequential group. Thus, 13 is recorded and 11 and 12 are freed from the acknowledgement collection. The indicator now reflects a group of acknowledgements that includes acknowledgements for writes assigned sequential identifications 1-13.

At 513, first storage array 410 receives a write request for IO-4. First storage array 410 processes write request IO-4 and locally commits it at 514 to its storage drive(s). As shown at, first storage array 410 may assign IO-4 a sequential identification of 14 and place an entry for 14 in its in-flight data structure. Additionally, as shown in A, the acknowledgment collection is empty and the indicator is equal to 13. At 515, first storage array 410 mirrors write request IO-5 to second storage array 450.

In the example of FIG. 4, the indicator update frequency is 3. Accordingly, because at C, there are 11, 12, and 13 in the acknowledgment collection, first storage array 410 picks the highest number from the sequential group of three. However, in other examples, the update frequency is more or less than 3 (e.g., 5, 10, 15, etc.) Decreasing the frequency of updates may increase efficiency.

In the example of FIG. 4, in the event that second storage array 450 becomes unavailable at time T1, first storage array 410 would continue to process write requests received during the time that second storage array 450 is unavailable. Upon reconnection of second storage array, first storage array 410 and second storage array would first go through a resync process. Based on the inflight data structure at C, first storage array 410 would replay the write assigned the sequential identification 13, Additionally, because the indicator is 10 and there are acknowledgements in acknowledgement collection that are higher than the indicator (11 and 12), first storage array 410 additionally replays the writes assigned sequential identifications 11 and 12. First storage array 410 would then also replicate to second storage array 450 that were received after the disconnection of the second storage array 450 up to the time of re connection.

However, in the event that second storage array 450 becomes unavailable at time T2, and upon reconnection, first storage array 410 would not replay any writes because the inflight data structure is empty. Additionally, as there are no acknowledgements in the acknowledgement collection that are higher than the indicator of 13, there are no writes that need to be replayed based on the indicator. Additionally, in the event that there are acknowledgements that are lower than the indicator 13, first storage array 410 may know to ignore and/or delete the writes associated to these acknowledgements.

In the event that there are acknowledgments in the acknowledgement collection at point D that is lower than indicator 13, first storage array 410 would know to ignore the write associated with that sequential identification.

Without the tracking of in-flight writes and/or an acknowledgement indicator, first storage array 410 may instead rely on a last common snapshot to determine the difference between the volumes on first storage array and the last common snapshot, and send that difference to second storage array 450. This may require the sending of unnecessary data and may result in slower resync times than examples discussed herein.

Figure 5:
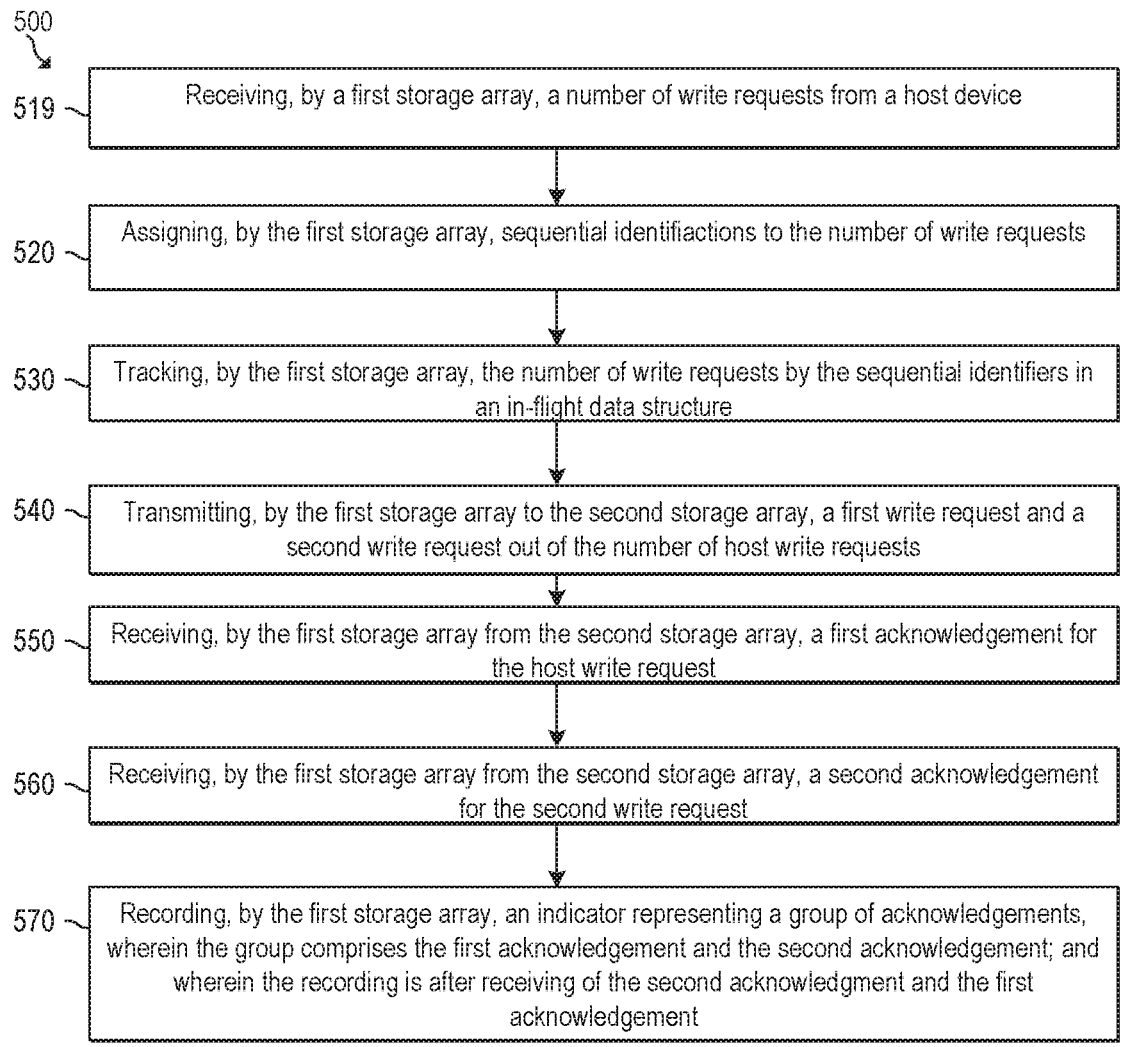
FIG. 5 is a flowchart of a method of recording in-flight writes and acknowledgements, according to some examples.

FIG. 5 illustrates a flowchart for a method 500 to record an indicator representing a group of acknowledgements. Although the execution of method 500 is described below with reference to storage system 200 of FIG. 2, other suitable systems for execution of method 500 may be utilized (e.g., computing device 100 or storage system 300). Additionally, implementation of method 500 is not limited to such examples and method 500 may be used for any suitable device or system described herein or otherwise.

At 519 of method 500, input engine 211 receives a number of write requests from a host computing device. As used herein, a number may include one or more than one write requests. Additionally, the number of write request do not have to be received at the same time. For example, a first write request out of the number of write requests may be received first and a second write request may be received after the first write request. At 520, in-flight engine 212 assigns sequential identifications to the number of write requests. The sequential identifications may order the write requests in a logical order, such as based on the time at which the write request was received by first storage array 210. At 530, in-flight engine 212 tracks the number of write requests in in-flight data 218 that is stored in persistent memory 216. The write requests may be tracked using the sequential identifications.

At 540, replication engine 213 may transmit to second storage array 250 a first write request and a second write request out of the number of write requests. In some examples, the first write request and the second write request that are transmitted coincide with the order in which they are received by the first storage array. However, in some examples, the first write request and the second write request that are transmitted do not coincide with the order in which they are received by the first storage array.

At 550, acknowledgement engine 214 receives from the second storage array 250, a first acknowledgement for the first write request. The acknowledgement received is associated with the sequential identification assigned to the first write request. At 560, acknowledgement engine 214 receives from the second storage array 250 a second acknowledgement for the second write request. The second acknowledgement is received after the receiving of the first acknowledgement. The acknowledgement received is associated with the sequential identification assigned to the second write request. At 570, acknowledgement engine records an indicator 217 in persistent memory 216. The indicator represents a group of acknowledgements comprising the first acknowledgement and the second acknowledgment.

In some examples, the indicator is recorded after receiving of the second acknowledgement. Additionally, the indicator may be equal to the sequential identification that is assigned to the write of the second acknowledgement. Thus, accordingly, the indicator is not recorded upon the receiving of the first acknowledgement and instead recorded after receiving of the second acknowledgement. This allows the recording of the acknowledgement to be batched so less changes or updates to the indicator is done. This reduces the latency effects that may be added by the creation and/or updating of the indicator 217 in persistent memory 216.

Although the flowchart of FIG. 5 shows a specific order of performance of certain functionalities, method 500 is not limited to that order. For example, some of the functionalities shown in succession may be performed in a different order, may be executed concurrently or with partial concurrence, or a combination thereof. In some examples, functionalities described herein in relation to FIG. 5 may be provided in combination with functionalities described herein in relation to any of FIGS. 1-4.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that when executed, cause a processing resource to:
   receive, at a first storage array, a first data write request from a host computing device;
   assign a first identification to the first data write request;
   record the first identification in in-flight data;
   transmit the first data write request to a second storage array;
   receive a first acknowledgement of the first data write request from the second storage array; and
   record an indicator representing a group of acknowledgements, wherein the group of acknowledgements comprises the first acknowledgement.

2. The non-transitory machine-readable storage medium of claim 1, comprising instructions, that when executed, cause the processing resource to receive a second acknowledgement of a second data write request from the second storage array;
   wherein the second acknowledgement is received after the first acknowledgment is received; and
   wherein the group of acknowledgements comprises the second acknowledgement.

3. The non-transitory machine-readable storage medium of claim 1, comprising instructions, that when executed, cause the processing resource to remove the first identification from the in-flight data in response to receiving the first acknowledgement.

4. The non-transitory machine-readable storage medium of claim 1, comprising instructions, that when executed, cause the processing resource to:
   receive a second data write request from the host computing device;
   assign a second identification to the second data write request;
   record the second identification in the in-flight data;
   transmit the second data write request to the second storage array; and
   receive a second acknowledgement of the second data write request from the second storage array, wherein the group of acknowledgements does not comprise the second acknowledgement.

5. The non-transitory machine-readable storage medium of claim 4, comprising instructions, that when executed, cause the processing resource to:
   receive a disconnection message indicating an unavailability of the second storage array;
   receive a third data write request from the host computing device;
   receive a connection message indicating reconnection to the second storage array;
   wherein the instructions to re-sync the second storage array comprises instructions, that when executed, cause the processing resource to:
   replay write requests assigned to identifications in the in-flight data; and
   replay write requests assigned to identifications that are not in the group of acknowledgments.

6. The non-transitory machine-readable storage medium of claim 5, wherein the instructions to re-sync of the second storage array comprises instructions, that when executed, cause the processing resource to:
   generate a snapshot of the first storage array based on the receiving of a disconnection message, wherein the snapshot comprises the third data write request;
   sync the first storage array and the second storage array based on the snapshot.

7. A storage system comprising:
   a first storage array;
   a second storage array;
   a replication link connecting the first storage array and the second storage array in a synchronous replication relationship;

wherein the first storage array comprises at least one processing resource and at least one non-transitory machine readable storage medium comprising instructions executable by the at least one processing resource to:

receive a write request from a host computing device;

assign a sequence identification to the write request and to record the sequence identification in an in-flight data structure on the first storage array;

transmit the write request via the replication link to the second storage array and to receive a first acknowledgement for the write request via the replication link;

record an indicator on the first storage array, wherein the indicator represents a group of acknowledgements received from the second storage array; and sync a first volume of the first storage array to a second volume of the second storage array based on the in-flight data structure and the indicator.

8. The storage system of claim 7, wherein the second storage array comprises at least one second processing resource and at least one second non-transitory machine readable storage medium comprising second instructions executable by the at least one second processing resource to:

receive a second write request from the host computing device;

assign a second sequence identification to the second write request and to record the second sequence identification in a second in-flight data structure on the second storage array;

transmit the second write request via the replication link to the first storage array and to receive a second acknowledgement for the second write request via the replication link;

record a second indicator on the second storage array, wherein the second indicator represents a second group of acknowledgements received from the first storage array; and sync the first storage array to the second storage array based on the second in-flight data structure and the second indicator.

9. The storage system of claim 7, wherein the instructions are executable by the at least one processing resource to record the indicator after receiving multiple acknowledgements.

10. The storage system of claim 7, wherein the first volume is an upstream volume and the second volume is a downstream volume; and wherein the instructions are executable by the at least one processing resource to replay writes assigned sequential identifications that are recorded in the in-flight data structure.

11. The storage system of claim of claim 7, wherein the first volume is a downstream volume and the second volume is an upstream volume; and wherein the instructions are executable by the at least one processing resource to delete data committed on the first storage array based on the in-flight data structure and to write data from the upstream volume to the first storage array.

12. The storage system of claim 7, wherein the instructions are executable by the at least one processing resource to replay the data request based on the indicator.

13. The storage system of claim 7, wherein the instructions are executable by the at least one processing resource to:

receive a second write request:

assign a second sequence identification to the second write request and to record the second sequence identification in the in-flight data structure:

transmit the second write request via the replication link to the second storage array; and receive a second acknowledgement for the second write request;

wherein the group of acknowledgements comprises the first acknowledgment and the second acknowledgement; and wherein the indicator is equal to the second sequence identification.

14. A method of resyncing a first storage array and a second storage array, the method comprising:

receiving, by the first storage array, a number of write requests from a host computing device;

assigning, by the first storage array, sequential identifications to the number of write requests;

storing, by the first storage array, the number of write requests by the sequential identifications in an in-flight data structure;

transmitting, by the first storage array to the second storage array, a first write request and a second write request out of the number of write requests;

receiving, by the first storage array from the second storage array, a first acknowledgement for the first write request;

receiving, by the first storage array from the second storage array, a second acknowledgement for the second write request;

recording, by the first storage array, an indicator representing a group of acknowledgments, wherein the group comprises the first acknowledgment and the second acknowledgment; and wherein the recording is after the receiving of the first acknowledgement and the second acknowledgment.

15. The method of claim 14, wherein the indicator is not recorded after receiving the first acknowledgment.

16. The method of claim 14, comprising removing, by the first storage array, the sequential identification assigned to the first write request in response to the receiving of the first acknowledgment.

17. The method of claim 14, wherein the group of acknowledgements comprises a sequential group of acknowledgements; and wherein the indicator is equal to the sequential identification assigned to the highest sequential identification in the sequential group of acknowledgements.

18. The method of claim 14, comprising replaying one or more of the number of write requests based on the indicator.

19. The method of claim 14, comprising:

changing an upstream role of the first storage array to a downstream role;

changing a downstream role of the second storage array to an upstream role; and deleting a number of committed writes out of the number of write requests based on the in-flight data structure, wherein the number of committed writes are not acknowledged to the host computing device.

* * * * *